(12) United States Patent
Hu et al.

(10) Patent No.: US 8,483,012 B2
(45) Date of Patent: Jul. 9, 2013

(54) CONTROLLING METHOD FOR ULTRA-SOUND SENSOR

(75) Inventors: Chao-Wen Hu, Hsinchu (TW); Yi-Chung Lee, Hsinchu (TW)

(73) Assignee: Lite-On It Corporation, Hsinchu (TW)

( * ) Notice: Subject to any disclaimer, the term of this patent is extended or adjusted under 35 U.S.C. 154(b) by 497 days.

(21) Appl. No.: 12/723,739

(22) Filed: Mar. 15, 2010

(65) Prior Publication Data

US 2011/0122729 A1    May 26, 2011

(30) Foreign Application Priority Data

Nov. 20, 2009  (CN) .......................... 2009 1 0226445

(51) Int. Cl.
*G01S 15/04* (2006.01)
(52) U.S. Cl.
USPC .................................. 367/98; 367/95; 367/99
(58) Field of Classification Search
USPC ......................................... 367/95, 97, 98, 99
See application file for complete search history.

(56) References Cited

U.S. PATENT DOCUMENTS

| | | | | |
|---|---|---|---|---|
| 4,975,889 A | * | 12/1990 | Petrucelli et al. | 367/98 |
| 5,077,701 A | * | 12/1991 | Lill | 367/98 |
| 5,150,334 A | * | 9/1992 | Crosby | 367/98 |
| 5,303,205 A | * | 4/1994 | Gauthier et al. | 367/108 |
| 6,853,850 B2 | * | 2/2005 | Shim et al. | 455/550.1 |
| 6,927,696 B2 | * | 8/2005 | Wasson Coley et al. | 340/686.6 |
| 7,092,512 B2 | * | 8/2006 | Kato et al. | 379/387.01 |
| 7,210,633 B2 | * | 5/2007 | Broere | 340/501 |
| 2005/0221792 A1 | * | 10/2005 | Mattisson | 455/355 |

FOREIGN PATENT DOCUMENTS

EP    1865597 A1 * 12/2007

* cited by examiner

*Primary Examiner* — Ian Lobo
(74) *Attorney, Agent, or Firm* — Rabin & Berdo, P.C.

(57) ABSTRACT

A controlling method for ultra-sound sensor is provided. The method includes the steps of measuring a distance of an obstacle, determining whether the distance is smaller than a distance threshold, and adjusting a driving voltage if the distance is smaller than the distance threshold.

11 Claims, 3 Drawing Sheets

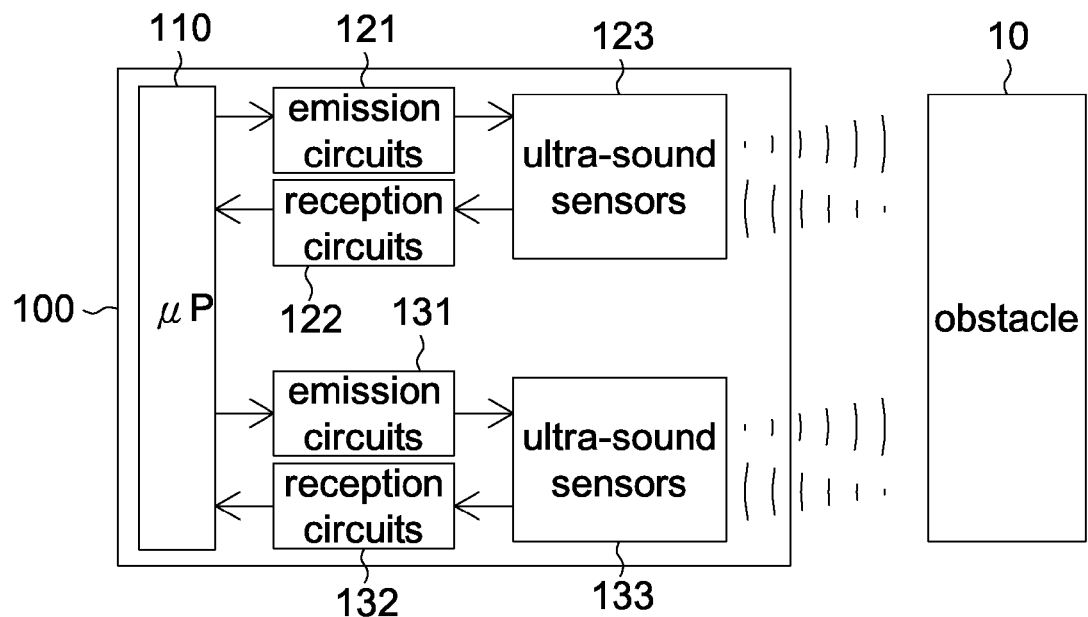
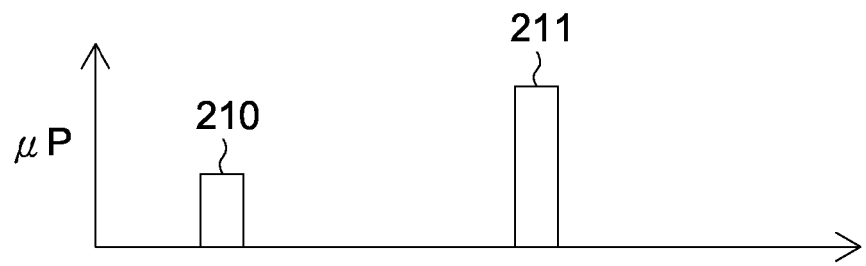
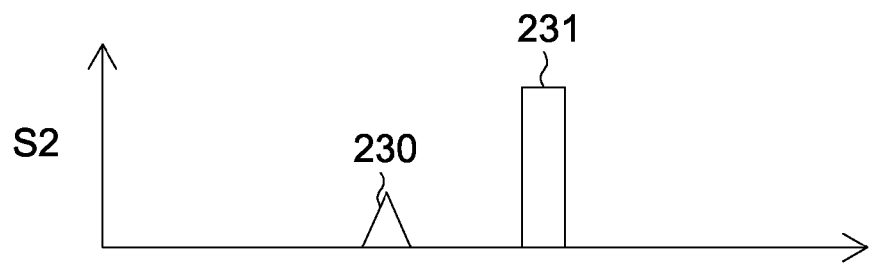
FIG. 2

CONTROLLING METHOD FOR ULTRA-SOUND SENSOR

This application claims the benefit of People's Republic of China application Serial No. 200910226445.0, filed Nov. 20, 2009, the subject matter of which is incorporated herein by reference.

TECHNICAL FIELD

The invention relates in general to a controlling method for ultra-sound sensor.

BACKGROUND

The ultra-sound sensor measures physical parameters such as location, speed and distance by emitting and receiving an ultra-sound wave. In an ordinary electronic device using an ultra-sound sensor, a micro-processor generates a driving voltage/current signal according to the frequency and magnitude of the to-be-emitted ultra-sound wave for driving the ultra-sound emitter to emit an ultra-sound wave. Then, the ultra-sound receiver receives the reflected ultra-sound wave and the micro-processor further converts the received ultra-sound wave into a voltage/current signal. Normally, the ultra-sound sensor has both functions of receiving and emitting ultra-sound waves.

In some applications, a single ultra-sound sensor is used for both emitting and receiving ultra-sound waves; and in other applications, two or more ultra-sound sensors are employed and signals are received and transmitted between these ultra-sound sensors. No matter application of one single or several ultra-sound sensors, due to the properties of the ultra-sound sensor, the detectable range of the ultra-sound sensor is restricted, especially in close distance detection.

When two or more ultra-sound sensors are employed, one ultra-sound sensor is used for emitting ultra-sound waves, and the other ultra-sound sensor is used for receiving reflected ultra-sound waves. In detection of an object in close distance, the influence of multiple reflections effect of reflective ultra-sound wave may become serious and the ultra-sound receiver has difficulty in correctly distinguishing main reflective ultra-sound wave from multi-reflective ultra-sound wave. So, it is difficulty to perform appropriate control.

When one single ultra-sound sensor is employed, a reverberation time or a ringing time will affect the shortest detectable distance. As disclosed above, the micro-processor will output a driving signal to the ultra-sound emitter. After the driving signal stops, the ultra-sound emitter is still in ultra-sound vibration for a short interval (i.e. the reverberation time or the ringing time) due to the inertial oscillation. That is, after the driving signal stops, the ultra-sound emitter still emits ultra-sound waves during the reverberation time or the ringing time and such occurrence is referred as "reverberation" or "ringing".

Let the applications using one single ultra-sound sensor be taken for example. The ultra-sound sensor emits and receives ultra-sound waves. If a reflective ultra-sound wave is received within the reverberation time, the micro-processor will not be able to distinguish the reflective ultra-sound wave due to the overlap between the reflective ultra-sound wave and the emitted ultra-sound wave within the reverberation time. Therefore, in the application using one single ultra-sound sensor, it is to avoid detection of an object within a distance related to the reverberation time (i.e. the distance is equal to a multiplication of an ultra-sound speed and the reverberation time). In other words, the reverberation time will restrict the shortest detectable distance of the ultra-sound sensor.

BRIEF SUMMARY

One example of the invention is directed to a controlling method for ultra-sound sensor. When it is detected that the obstacle is very close, the driving voltage of the ultra-sound sensor will be increased so as to increase the reliability in detecting reflective ultra-sound wave.

Another example of the invention is directed to a controlling method for ultra-sound sensor. When it is detected that the obstacle is very close, the driving voltage of the ultra-sound sensor will be decreased so as to improve or shorten the shortest detectable distance.

According to a first example of the present invention, a controlling method used in an ultra-sound sensor is provided. The method includes the steps of measuring a distance between an obstacle and the ultra-sound sensor, determining whether the distance is smaller than a distance threshold and decreasing a driving voltage of the ultra-sound sensor if the distance is smaller than the distance threshold.

According to a second example of the present invention, a controlling method used in a first ultra-sound sensor and a second ultra-sound sensor is provided. The method includes the steps of measuring a distance between an obstacle and the first and the second ultra-sound sensors, determining whether the distance is smaller than a distance threshold and increasing a driving voltage of the first and the second ultra-sound sensors if the distance is smaller than the distance threshold.

According to a third example of the present invention, a controlling method for a ultra-sound sensor includes the steps of measuring a distance of an obstacle, determining whether the distance is smaller than a distance threshold and adjusting a driving voltage if the distance is smaller than the distance threshold.

It is to be understood that both the foregoing general description and the following detailed description are exemplary and explanatory only and are not restrictive of the disclosed embodiments, as claimed.

BRIEF DESCRIPTION OF THE DRAWINGS

FIG. 1 shows a functional diagram of an electronic device according to a first embodiment of the invention;

FIG. 2 shows a timing diagram according to the first embodiment of the invention;

DETAILED DESCRIPTION OF EXEMPLARY EMBODIMENT OF THE INVENTION

Figure 3:
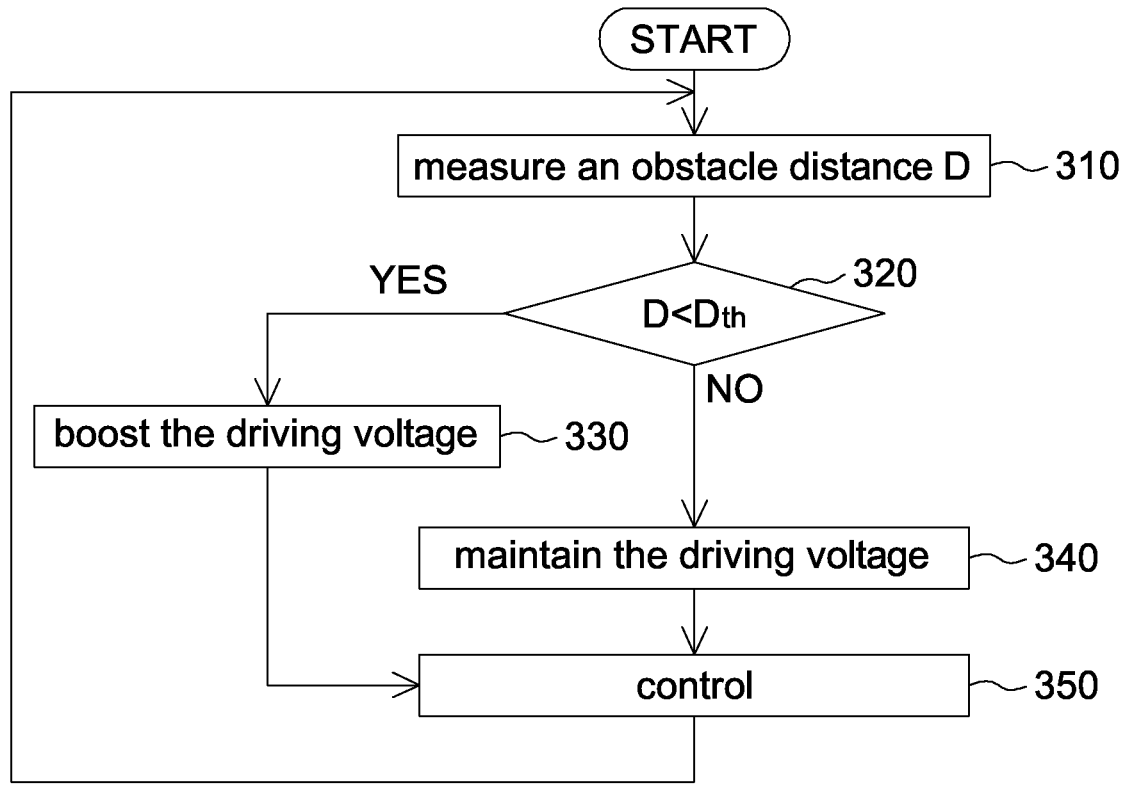
FIG. 3 shows a control process according to the first embodiment of the invention.

In the several embodiments of the invention, when it is detected that the obstacle is very close to the ultra-sound sensor, the driving voltage of the ultra-sound sensor will be adjusted (increased or decreased) to increase the reliability in detecting the reflective ultra-sound wave or improve the shortest detectable distance.

First Embodiment

In the first embodiment of the invention, when it is detected that the obstacle is very close to the ultra-sound sensor, the driving voltage of the ultra-sound sensor will be increased to increase the detection reliability. For the convenience of elaboration, the first embodiment of the invention is exemplified by the application of two ultra-sound sensors. However, it is understood that the invention is not limited thereto. That is, the application of more ultra-sound sensors can also be adapted to other embodiments of the invention.

FIG. 1 shows a functional diagram of an electronic device according to a first embodiment of the invention. As indicated in FIG. 1, the electronic device 100 comprises a micro-processor (μP) 110, two emission circuits 121 and 131, two reception circuits 122 and 132 and two ultra-sound sensors 123 and 133. The micro-processor 110 emits a driving signal to the emission circuits 121 and 131. The ultra-sound sensors 123 and 133 are driven to emit ultra-sound waves according to the driving signal.

When the ultra-sound wave reaches an obstacle 10 (such as the hand or the wall), the ultra-sound wave will be reflected as a reflective ultra-sound wave, which is received by the ultra-sound sensors 123 and 133. The reception circuits 131 and 132 convert the reflective ultra-sound wave into a voltage/current signal and further transmit the voltage/current signal to the micro-processor 110. The micro-processor 110 measures the time difference from the emission time of the ultra-sound wave to the reception time of the reflective ultra-sound wave. The distance between the ultra-sound sensor and the obstacle (that is, the distance between the electronic device and the obstacle) can be obtained by multiplying the time difference by the ultra-sound speed.

FIG. 2 shows a timing diagram according to the first embodiment of the invention. In FIG. 2, μP denotes the voltage pulse signal (also referred as the driving voltage) emitted from the micro-processor, S1 denotes the ultra-sound signal received/emitted by the first ultra-sound sensor, and S2 denotes the ultra-sound signal received/emitted by the second ultra-sound sensor. In the present embodiment of the invention, the voltage pulse signal emitted from the micro-processor is alternately outputted to one of the ultra-sound sensors for emitting ultra-sound waves and the other one of the ultra-sound sensors receives reflective ultra-sound waves. However, in other embodiments, the voltage pulse signal outputted from the micro-processor can be outputted to a pre-defined one of the two ultra-sound sensors for emitting ultra-sound waves and the other ultra-sound sensor receives reflective ultra-sound waves.

As indicated in FIG. 2, the voltage pulse signal 210 is first outputted to a first ultra-sound sensor, so that the first ultra-sound sensor can emit an ultra-sound signal 220. When the ultra-sound signal 220 reaches an obstacle, the ultra-sound signal 220 is reflected as a reflective ultra-sound wave 230 which is received by the second ultra-sound sensor. The micro-processor calculates the time difference from the emission time of the ultra-sound signal 220 to the reception time of the reflective ultra-sound wave 230 so as to calculate the distance between the two ultra-sound sensors and the obstacle. In the present embodiment, the two ultra-sound sensors are assumed to be in identical distance from the obstacle.

The micro-processor determines whether the distance between the two ultra-sound sensors and the obstacle is too close according to the calculation. If the micro-processor determines that the distances between the two ultra-sound sensors and the obstacle are too close, then the micro-processor will increase the driving voltage (that is, increase the amplitude of the voltage pulse signal). After the amplitude of the voltage pulse signal 211 is increased, the voltage pulse signal 211 is inputted to the second ultra-sound sensor. Then, the second ultra-sound sensor will emit an ultra-sound signal 231 according to the voltage pulse signal 211 whose amplitude is increased. When the ultra-sound signal 231 reaches the obstacle, the ultra-sound signal 231 will be reflected as a reflective ultra-sound wave 221, which is received by the first ultra-sound sensor.

In general technologies, when the obstacle distance (i.e. the distance between the obstacle and the ultra-sound sensor) is too close, the ultra-sound sensor will receive multi-reflective ultra-sound waves, wherein the multi-reflective ultra-sound waves refers to that the ultra-sound waves are subjected to multiple reflections. Normally speaking, after multiple reflections, the amplitude of the multi-reflective ultra-sound waves will decay. However, if the amplitude of the main reflective ultra-sound wave is not much larger than the amplitude of the multi-reflective ultra-sound waves, the micro-processor may have difficulty in distinguishing the main reflective ultra-sound wave from the multi-reflective ultra-sound waves, resulting in difficult control or even error operations.

In the first embodiment of the invention, when the micro-processor determines that the obstacle distance is too short, the micro-processor will boost the driving voltage (that is, increase the amplitude of the emitted ultra-sound signal), so that the intensity/amplitude of the main reflective ultra-sound wave (such as the reflective ultra-sound wave 221) is also increased. So, the difference in the amplitude between the main reflective ultra-sound wave and the multi-reflective ultra-sound waves are more distinguishable. Thus, when the ultra-sound sensor receives multi-reflective ultra-sound waves, the micro-processor still can distinguish the main reflective ultra-sound waves according to their amplitude and perform appropriate control due to large amplitude difference between the main reflective ultra-sound wave and the multi-reflective ultra-sound waves.

FIG. 3 shows a control process according to the first embodiment of the invention. As indicated in FIG. 3, firstly, an obstacle distance D is measured as indicated in step 310. The details of step 310 are discussed in the above disclosure and are not repeated here.

In step 320, whether the obstacle distance D is smaller than a distance threshold $D_{th}$ is determined. If so, this implies that the obstacle is too close to the ultra-sound sensor. Therefore, if the obstacle distance D is smaller than the distance threshold $D_{th}$, the micro-processor will boost the driving voltage (that is, to increase the intensity of the emitted ultra-sound) as indicated in step 330. To the contrary, if obstacle distance D is larger than or equal to the distance threshold $D_{th}$, the micro-processor will maintain the driving voltage (that is, to maintain the intensity of the emitted ultra-sound) as indicated in step 340.

Afterwards, the micro-processor will perform corresponding control according to the obstacle distance D as indicated in step 350. In the first embodiment of the invention, the micro-processor performs corresponding control such as but not limited to the ON/OFF control of the lamp, distance measurement etc.

Second Embodiment

In the second embodiment of the invention, when it is detected that the obstacle distance is too short, the driving voltage of the ultra-sound sensor will be decreased to improve (i.e. shorten) the shortest detectable distance. The second embodiment of the invention is also adapted to a single ultra-sound sensor.

Figure 4:
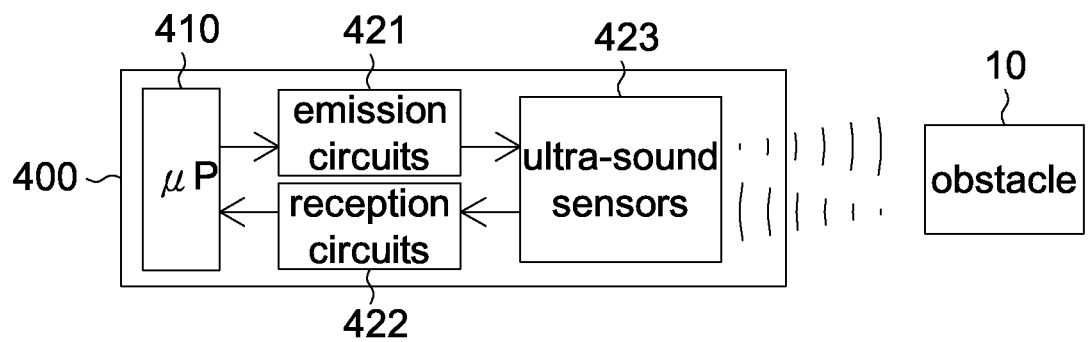
FIG. 4 shows a functional diagram of an electronic device according to a second embodiment of the invention.

FIG. 4 shows a functional diagram of an electronic device according to the second embodiment of the invention. As indicated in FIG. 4, the electronic device 400 comprises a micro-processor 410, an emission circuit 421, a reception circuit 422 and an ultra-sound sensor 423. The functions of these elements are similar to the elements of FIG. 1, and are not repeated here.

Figure 5:
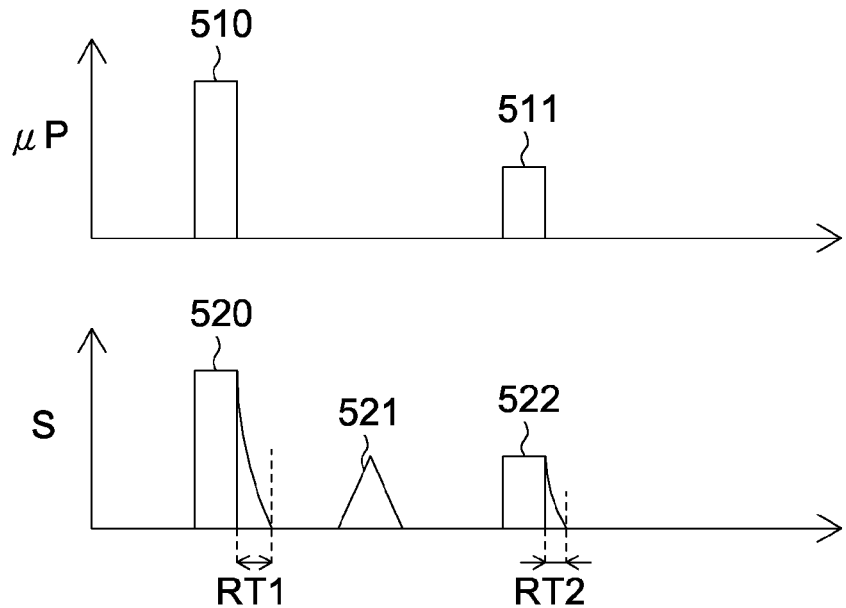
FIG. 5 shows a timing diagram according to the second embodiment of the invention.

FIG. 5 shows a timing diagram according to the second embodiment of the invention. In FIG. 5, μP denotes the voltage pulse signal emitted from the micro-processor, and S denotes the ultra-sound signal received/emitted by the ultra-sound sensor.

As indicated in FIG. 5, the voltage pulse signal 510 is inputted to the ultra-sound sensor, and then the ultra-sound sensor emits an ultra-sound signal 520. When the ultra-sound signal 520 reaches an obstacle, the ultra-sound signal 520 will be reflected as a reflective ultra-sound wave 521, which is received by the ultra-sound sensor. After the reflective ultra-sound wave 521 is received, the micro-processor calculates the time difference from the emission time of the ultra-sound signal 520 to the reception time of the reflective ultra-sound wave 521 so as to calculate the distance between the ultra-sound sensor and the obstacle (i.e. to calculate the obstacle distance).

The micro-processor determines whether the distance between the ultra-sound sensor and the obstacle is too short according to the calculation. If the micro-processor determines that the distance between the ultra-sound sensor and the obstacle is too short, then the micro-processor will step down the driving voltage (that is, to reduce the amplitude of the voltage pulse signal). The voltage pulse signal 511 whose amplitude is reduced is inputted to the ultra-sound sensor. After that, the ultra-sound sensor emits an ultra-sound signal 522 according to the voltage pulse signal 511 whose amplitude is reduced.

According to the general technologies, when the obstacle distance is too short, the reception time of the reflective ultra-sound wave may overlap with the reverberation time. That is, when the ultra-sound sensor still reverberates, the reflective ultra-sound wave reaches and is received by the ultra-sound sensor. The micro-processor is unable to distinguish the reflective ultra-sound wave as the reflective ultra-sound wave overlaps with the emitted ultra-sound wave. As for an ordinary ultra-sound sensor, the shortest detectable distance is set to avoid the overlap of the reception time of the reflective ultra-sound wave with the reverberation time; and the longer the reverberation time, the longer the shortest detectable distance of the ultra-sound sensor will be. That is, the ultra-sound sensor is unable to detect the object whose distance from the ultra-sound sensor is too short.

In the second embodiment of the invention, when the micro-processor determines that the obstacle distance is too short, the micro-processor will step down the driving voltage (that is, to reduce the intensity of the emitted ultra-sound signal) so as to shorten the reverberation time. The amplitude of the ultra-sound signal has much to do with the reverberation time. Again, referring to FIG. 5, if the ultra-sound signal 520 has a larger amplitude, the reverberation time RT1 will be longer; and if the ultra-sound signal 522 has a smaller amplitude, the reverberation time RT2 will be shorter, wherein RT1>RT2. Thus, the amplitude of the ultra-sound signal can be reduced by stepping down the driving voltage so that the reception time of the reflective ultra-sound wave is not overlapped with the reverberation time and the reflective ultra-sound wave is distinguished by the micro-processor. As the shortest detectable distance of the ultra-sound sensor is defined by multiplying the reverberation time by the ultra-sound speed, the shortest detectable distance can be shortened if the reverberation time is shortened by stepping down the driving voltage.

Figure 6:
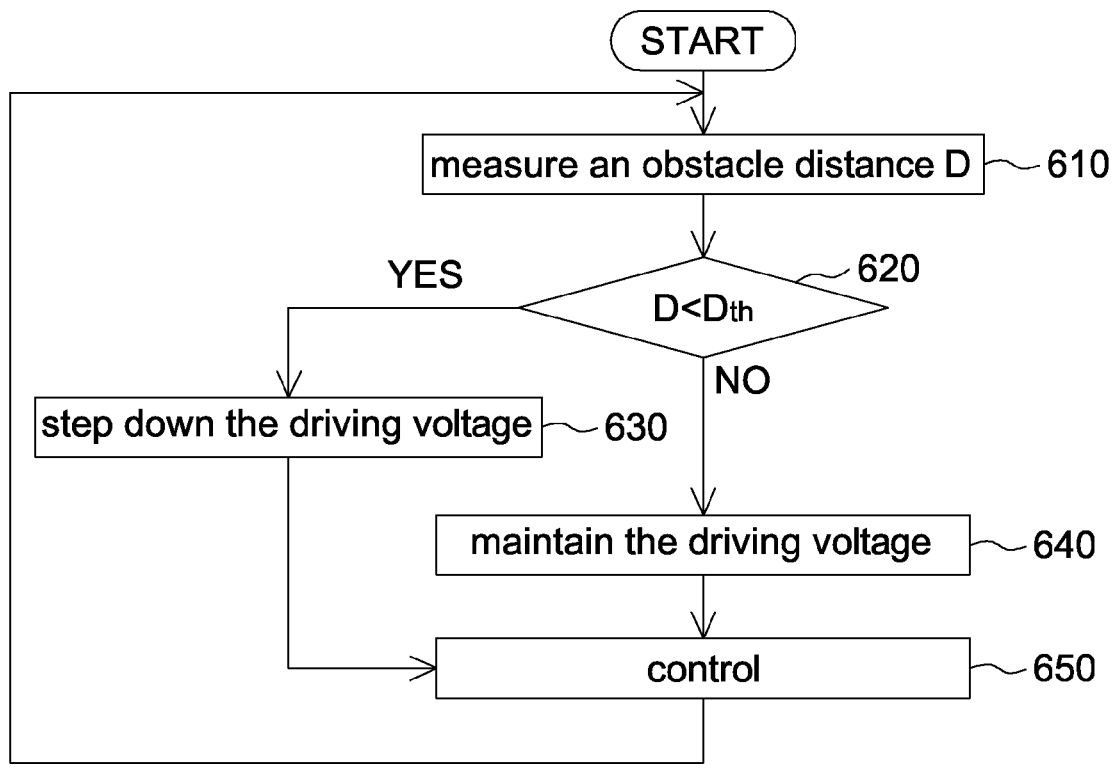
FIG. 6 shows a control process according to the second embodiment of the invention.

FIG. 6 shows a control process of according to the second embodiment of the invention. As indicated in FIG. 6, firstly, an obstacle distance D is measured in step 610. The details of step 610 are discussed from the above disclosure, and are not repeated here.

In step 620, whether the obstacle distance D is smaller than a distance threshold $D_{th}$. is determined. If so, this implies that obstacle distance the ultra-sound sensor is too short. If the obstacle distance D is smaller than the distance threshold $D_{th}$, the micro-processor will step down to the driving voltage (that is, to reduce the intensity of the emitted ultra-sound) in step 630.

To the contrary, if the obstacle distance D is larger than or equal to the distance threshold $D_{th}$, the micro-processor will maintain the driving voltage (that is, maintain the intensity of the emitted ultra-sound) as in step 640. Afterwards, the micro-processor performs corresponding control according to the obstacle distance D as in step 650.

In the second embodiment of the invention, the micro-processor performs corresponding control such as but not limited to the ON/OFF control of the lamp and the distance measurement.

It will be appreciated by those skilled in the art that changes could be made to the disclosed embodiments described above without departing from the broad inventive concept thereof. It is understood, therefore, that the disclosed embodiments are not limited to the particular examples disclosed, but is intended to cover modifications within the spirit and scope of the disclosed embodiments as defined by the claims that follow.

What is claimed is:

1. A controlling method used in an ultra-sound sensor, the method comprising:
    driving the ultra-sound sensor to emit an ultra-sound wave for sensing an obstacle;
    measuring a distance between the obstacle and the ultra-sound sensor;
    determining whether the distance is smaller than a distance threshold; and
    stepping down the driving voltage of the ultra-sound sensor if the distance is smaller than the distance threshold.

2. The method according to claim 1, wherein, the step of stepping down the driving voltage of the ultra-sound sensor comprises: stepping down an intensity of an ultra-sound signal emitted from the ultra-sound sensor to shorten a reverberation time of the ultra-sound sensor.

3. The method according to claim 1, further comprising: maintaining the driving voltage of the ultra-sound sensor if the distance is larger than or equal to the distance threshold.

4. A controlling method used in a first ultra-sound sensor and a second ultra-sound sensor, the method comprising:
    driving the ultra-sound sensor to emit an ultra-sound wave for sensing an obstacle;
    measuring a distance between the obstacle and the first and the second ultra-sound sensors;
    determining whether the distance is smaller than a distance threshold; and
    boosting the driving voltage of the first and the second ultra-sound sensor if the distance is smaller than the distance threshold.

5. The method according to claim 4, further comprising: maintaining the driving voltage of the first and the second ultra-sound sensor if the distance is larger than or equal to the distance threshold.

6. A controlling method for an ultra-sound sensor, comprising:
- driving the ultra-sound sensor to emit an ultra-sound wave for sensing an obstacle;
- measuring the distance of an obstacle;
- determining whether the distance is smaller than a distance threshold; and
- adjusting the driving voltage of the ultra-sound sensor if the distance is smaller than the distance threshold.

7. The method according to claim 6, wherein the step of measuring the distance of the obstacle further comprises: measuring the distance between the obstacle and a first ultra-sound sensor.

8. The method according to claim 7, wherein the step of adjusting the driving voltage further comprises: stepping down the driving voltage of the first ultra-sound sensor.

9. The method according to claim 6, wherein the step of measuring the distance of the obstacle further comprises: measuring the distance between the obstacle and first and second ultra-sound sensors.

10. The method according to claim 9, wherein, the step of adjusting the driving voltage further comprises: boosting the driving voltage of the first and the second ultra-sound sensors.

11. The method according to claim 6, further comprising:
- maintaining the driving voltage if the distance is larger than or equal to the distance threshold.

* * * * *